(12) United States Patent
Cavender et al.

(10) Patent No.: US 12,031,060 B1
(45) Date of Patent: Jul. 9, 2024

(54) EFFICIENT MEKO-FREE ANTI-SKINNING AGENT

(71) Applicant: PATCHAM USA LLC, Fairfield, NJ (US)

(72) Inventors: Stephen Edward Cavender, Charlotte, NC (US); Bhavesh Patel, Sharjah (AE); Nishith Patel, Old Bridge, NJ (US)

(73) Assignee: PATCHAM USA LLC, Fairfield, NJ (US)

( * ) Notice: Subject to any disclaimer, the term of this patent is extended or adjusted under 35 U.S.C. 154(b) by 0 days.

(21) Appl. No.: 18/084,432

(22) Filed: Dec. 19, 2022

(51) Int. Cl.
| | |
|---|---|
| *C09D 7/00* | (2018.01) |
| *C09D 7/20* | (2018.01) |
| *C09D 7/46* | (2018.01) |
| *C09D 7/63* | (2018.01) |

(52) U.S. Cl.
CPC ............... *C09D 7/46* (2018.01); *C09D 7/20* (2018.01); *C09D 7/63* (2018.01)

(58) Field of Classification Search
None
See application file for complete search history.

(56) References Cited

U.S. PATENT DOCUMENTS

| | | | | |
|---|---|---|---|---|
| 3,341,589 | A * | 9/1967 | Jones | C07C 201/00 106/287.3 |
| 5,322,872 | A * | 6/1994 | Quinn | C08K 5/0091 252/406 |
| 7,875,111 | B2 | 1/2011 | Nowak et al. | C09D 7/04 |
| 2010/0224099 | A1 | 9/2010 | Nowak et al. | C09D 7/04 |
| 2016/0304732 | A1 | 10/2016 | Asirvatham et al. | C09D 7/04 |
| 2021/0261800 | A1 | 8/2021 | Asirvatham et al. | C09D 7/46 |

FOREIGN PATENT DOCUMENTS

| | | | | |
|---|---|---|---|---|
| GB | 870787 A1 * | 6/1961 | | |
| WO | WO2016172108 | 10/2016 | | C07D 7/04 |
| WO | WO2021108507 | 6/2021 | | C09D 201/00 |

OTHER PUBLICATIONS

European Search Report issued in corresponding European Patent Application Serial No. 23168956.3, dated Oct. 12, 2023, 6 pages.

* cited by examiner

*Primary Examiner* — Stefanie J Cohen
(74) *Attorney, Agent, or Firm* — HAYES SOLOWAY P.C.

(57) ABSTRACT

A clear homogenous, efficient, MEKO-free anti-skinning composition, for use in alkyd-based coating materials containing metal carboxylate driers, contains a mixture of cyclohexanone oxime and/or a petroleum distillate soluble zinc carboxylate dissolved in methyl propyl ketoxmine.

33 Claims, No Drawings

EFFICIENT MEKO-FREE ANTI-SKINNING AGENT

FIELD OF THE INVENTION

This invention provides efficient, Methyl Ethyl Ketoxime (MEKO)—free anti-skinning agents for use in the production of alkyd-based paint and ink coatings. These anti-skinning compositions are especially useful in the manufacture of alkyd-based coatings containing metal carboxylates utilized as Driers. In this context efficient is taken to mean requiring a significantly lower dose, greater than 20%, less than that required for MEKO to achieve the same level of protection against skin formation, without imparting adverse drying times compared to the resulting coating containing MEKO. These compositions are clear homogenous solutions of cyclohexanone oxime (CHO) and zinc carboxylate dissolved in methyl propyl ketoxime (MPKO).

BACKGROUND

Autoxidative, air-drying coating compositions based on alkyd resins will dry by themselves but almost entirely in an unpractical time frame. Catalysts, "driers", usually metal carboxylates, are incorporated to accelerate this drying process. These driers enable the paint to dry within a few hours instead of days or weeks; however, they can also cause the coating material to exhibit some premature drying in the can during shipment or upon storage. This unwanted reaction shows up as a skin on the surface of the liquid coating material and the process is referred to as "skinning".

Drying and skinning of alkyd-based paints and coatings are essentially the same so it is a challenge to provide an anti-skinning agent that will retard skin formation of the liquid coating material, whilst it is stored in the can, yet not significantly harm the dry time when it is subsequently applied to a substrate.

Although several materials have been employed as anti-skinning agents, in practice, methyl ethyl ketoxime (MEKO) is the most widely used for this purpose.

MEKO is a liquid at room temperature and exhibits relatively high flash point, >60° C., facilitating its applicability. It is known to form a complex with the primary metal-based driers temporarily pacifying them to prevent premature drying in the can. However, MEKO will easily be replaced by oxygen from air to facilitate drying once the coating is thinly applied onto a substrate and exposed to air. Additionally, MEKO provides benefits including low odor, applicability to a wide range of alkyd coatings, no yellowing or discoloration, no residue, minimal impact on the drying profile and no impact on the properties of the coating, such as gloss, adhesion, or solvent resistance.

Although MEKO is widely employed it reportedly exhibits some degree of toxicity to humans; it has been identified as a skin sensitizer and a suspected carcinogen. It appears likely that its future use will be regulated to protect public health.

Some proposals have been made for alternatives to MEKO in this context, for example:

WO2016172108A1 to Edward Asirvatham et al. 2016, discusses the use of 2 Pentanone Oxime (also known as Methyl Propyl Ketoxime, MPKO) as well as mixtures of MPKO with 3-methyl-2-butanone oxime, methyl isobutyl ketoxime, and MEKO either as impurities contained in or added to the MPKO. Such mixtures or 98% pure MPKO are stated to perform the same as MEKO at the same dosage, with respect to anti-skinning performance and subsequent dry times in alkyd-based coatings.

Another oxime, cyclohexanone oxime (CHO), has been used as an anti-skinning agent in relatively few applications even though its toxicological profile is far more favorable than MEKO. This is because cyclohexanone oxime is a crystalline solid at ambient temperatures. Significant time and mixing energy are required to dissolve cyclohexanone oxime in liquid oil based coating materials requiring anti-skinning agents. In other respects, cyclohexanone oxime is an attractive candidate for use as an efficient anti-skinning agent in oil-based coating materials due to its lower toxicity and low volatility.

The solubility of cyclohexanone oxime in previously known delivery solvents is limited, especially as the carrier must be selected for compatible with oil-based coating materials. Solvents employed in the manufacture of cyclohexanone oxime solutions reportedly include water; small chain alcohols e.g., $C_1$ to $C_5$, preferably $C_2$ to $C_4$; some nitriles; aliphatic hydrocarbons, such as n-hexane and cyclohexane; aromatic compounds, such as benzene and toluene; and ethers, such as dioxane. Many of these have poor toxicity, undesirably low flash point temperatures and still can only deliver cyclohexanone oxime in relatively low concentrations; meaning that large doses of the solutions are required to incorporate sufficient cyclohexanone oxime to realize its efficient anti-skinning attributes and further, the carrier solvent may become an unwanted ingredient.

US20100224099A1 to Milton Nowak et al 2010 demonstrated that higher levels of cyclohexanone oxime 25% to 35% could be solubilized in fatty acids. Relatively higher concentrations of cyclohexanone oxime are desirable for transportation, storage and application, but may be deleterious to physical stability of the resulting anti-skinning compositions over storage and manufacturing operations which are usually subject to temperatures from 10 to about 30° C. The efficiency of this type of mixture leaves a lot to be desired as 2 to 4 times the physical dose of MEKO is still required to provide adequate protection from skinning. However cyclohexanone oxime was stated as being more efficient than MEKO on a weight/weight basis.

Metal carboxylates typically used as driers in autoxidative drying coatings are principally carboxylates of cobalt, manganese, zirconium and calcium. Occasionally zinc carboxylates are incorporated as additional through driers. However, zinc carboxylates typically show a degree of antioxidant nature which is utilized in PVC as heat stabilizers and in greases and lubricants as anti-wear additives. Whilst these zinc products provide some degree of through drying their antioxidant nature typically means that the level of anti-skinning agent can be reduced slightly to maintain the same protection against skin formation, or the level of primary driers, cobalt or manganese, need to be increased slightly to maintain dry times. In light of this, zinc carboxylates demonstrate their potential to be utilized in an anti-skinning agent to increase the efficiency of the anti-skinning agent composition.

SUMMARY OF THE INVENTION

This invention is an anti-skinning composition which includes a solution of cyclohexanone oxime and/or zinc carboxylates in methyl propyl ketoxime.

The resulting solutions are demonstrated to provide a significant improvement of the anti-skinning efficiency compared to MEKO or MPKO when used on a weight/weight basis.

More particularly the present invention provides anti-skinning agent compositions that can be utilized in alkyd-based coatings that include metal carboxylate driers. They can be incorporated at a use level of between 20% and 40% less than MEKO and yet match the performance of MEKO.

In accordance with the present invention commercially available methyl propyl ketoxime (MPKO) is utilized as a solvent to dissolve commercially available Cyclohexanone oxime (CHO) with or without warming followed by filtration to produce a stable, clear solution containing up to 15% Cyclohexanone oxime by weight, preferably 9 to 15% by weight, more preferably 9 to 11% by weight.

In one embodiment we incorporate petroleum distillate soluble zinc carboxylates into MPKO itself or solutions of CHO in MPKO to produce anti-skinning compositions with still further improvement in efficiency compared to MEKO or MPKO when used on a weight/weight basis.

Here, the petroleum distillate soluble zinc carboxylate can be dissolved in MPKO to produce a solution contains up to 7.0% by weight zinc metal content, preferably 1.8% to 7.0% by weight zinc metal content, more preferably 4.5 to 4.7% by weight zinc metal content.

In another embodiment, the cyclohexanone oxime is present in concentrations from 9% to 15% by weight, preferably 9 to 11% by weight. The petroleum soluble zinc carboxylate is present at 0.9 to 3.5% by weight zinc metal content, preferably 2.2 to 2.4% by weight zinc metal content. The MPKO is present in 70 to 88% and more preferably 79 to 81%

Further, efficient MEKO-free anti-skinning agent in this invention can be diluted with petroleum distillates typically used in alkyd-based paints to produce MEKO-free anti-skinning agents that can conveniently be used as a weight/weight replacement for MEKO.

In one embodiment the above, MEKO-free anti-skinning agent mixtures of MPKO with CHO and/or Zinc Carboxylates are diluted with petroleum distillates typically used in alkyd-based paint formulation, e.g., mineral spirits or white spirits, 30 to 50% by weight, preferably 34 to 46% by weight, more preferably 38 to 42% by weight.

In another embodiment, the methyl propyl ketoxime is present in amounts from 35 to 91% by weight of the composition, preferably 46 to 70% by weight, more preferably 47 to 49% by weight.

In a further embodiment, the cyclohexanone oxime is present in concentrations of up to 15% by weight, preferably 3.0 to 6.2% by weight, more preferably 5.8 to 6.2% by weight.

In yet another embodiment, the petroleum soluble zinc carboxylate contains up to 0.69% by weight zinc metal content, preferably 0.9% to 3.5% by weight zinc metal content, more preferably 1.2 to 1.6% by weight zinc metal content.

In a further embodiment, the petroleum distillate comprises mineral spirits or white spirits, the petroleum distillate is present in an amount of up to 50% by weight of the composition, preferably 34 to 46% by weight, more preferably 38 to 42% by weight.

The present invention also provides a clear homogenous composition, for use as an anti-skinning composition with alkyd-based coating materials containing metal carboxylate driers, which comprises a mixture of a petroleum distillate soluble zinc carbonate dissolved in a petroleum distillate, and methyl propyl ketoxime.

In one embodiment the methyl propyl ketoxime comprises from 35 to 91% by weight of the composition, preferably 46 to 70% by weight of the composition, more preferably 47 to 49% by weight of the composition.

In another embodiment, petroleum distillate soluble zinc carboxylate dissolved in a petroleum distillate comprises up to 50% by weight of the composition.

In yet another embodiment petroleum distillate soluble zinc carboxylate comprises up to 7.0% by weight zinc metal content, preferably 1.8 to 7.0% by weight zinc content, more preferably 4.5 to 4.7% by weight zinc content.

In still yet another embodiment wherein the petroleum distillate soluble zinc carboxylate comprises 0.9 to 3.5% by weight zinc content, preferably 2.2 to 2.4% by weight zinc content.

In another and preferred embodiment the petroleum distillate comprises mineral spirits or white spirits.

In all embodiments, the composition is a clear, homogeneous, efficient, MEKO-free anti-skinning composition, stable throughout the temperature range of about 10 to about 30° C. for use in alkyd-based coating materials containing metal carboxylate driers and do not harm the subsequent coating dry times or final paint properties.

DETAILED DESCRIPTION OF THE INVENTION

Solutions of cyclohexanone oxime and/or zinc carboxylates in MPKO perform as efficient MEKO-free anti-skinning compositions for use in an oil-based paint or ink coatings containing metal carboxylates as driers.

Skinning tendency was determined by weighing 100 g of the white alkyd enamel containing driers and anti-skinning agent into a clean glass jar. These jars were kept open and observed for skin formation. Results were quoted to the nearest day.

The invention will be further described by reference to the following non-limiting examples:

Example 1

In this example, a solution consisting of 90% MPKO and 10% CHO designated as 90:10 MPKO:CHO was used as the anti-skinning agent. Preparation of white alkyd enamel:

| Raw Materials | % by wt. | Procedure |
|---|---|---|
| Mill Base | | |
| Long oil alkyd (S-10702) | 20.00 | Mix resin, dispersing additive, |
| Pat-Add DA 707 dispersing additive | 0.40 | viscogel gelly and white spirit at 1000 RPM for 10 minutes. |
| Viscogel b4 (10%) | 3.00 | |
| White spirit | 8.00 | |
| TiO$_2$ (R-902) | 22.00 | Add under stirring and grind it until 10 µm fineness. |
| Let down | | |
| Long oil alkyd (S-10702) | 30.00 | Add the remaining resin and white spirit at 800 RPM and |
| White spirit | 16.60 | mix it for 15 minutes at 800 RPM. |
| Total | 100.00 | |

Addition of Driers and Anti-Skinning Agent:

|  | Trial 1A | Trial 2A | Trial 3 | Trial 4 | Trial 5 |
|---|---|---|---|---|---|
| Anti-skinning agent used | None | MEKO | 90:10 MPKO: CHO | | |
| White alkyd enamel | 100.00 | 100.00 | 100.00 | 100.00 | 100.00 |
| Patcham Cobalt 10% | 0.18 | 0.18 | 0.18 | 0.18 | 0.18 |
| Patcham Zirconium 18% | 0.58 | 0.58 | 0.58 | 0.58 | 0.58 |
| Patcham Calcium 10% | 0.70 | 0.70 | 0.70 | 0.70 | 0.70 |
| Dosage % of Anti-skinning agent | — | 0.20 | 0.20 | 0.18 | 0.16 |

Comparison of Skinning Tendency:

|  | Trial 1A | Trial 2A | Trial 3 | Trial 4 | Trial 5 |
|---|---|---|---|---|---|
| Anti-skinning agent used | None | MEKO | 90:10 MPKO: CHO | | |
| Dosage of anti-skinning agent | — | 0.20 | 0.20 | 0.18 | 0.16 |
| Duration of complete skinning | 2 days | 8 days | 11 days | 8 days | 8 days |

Comparison of Physical Properties and Dry Times:

|  | Trial 1A | Trial 2A | Trial 3 | Trial 4 | Trial 5 |
|---|---|---|---|---|---|
| Anti-skinning agent used | None | MEKO | 90:10 MPKO:CHO | | |
| Dosage of anti-skinning agent | — | 0.20 | 0.20 | 0.18 | 0.16 |
| L* | 95.28 | 95.33 | 95.28 | 95.81 | 96.03 |
| a* | −1.14 | −1.13 | −1.20 | −1.15 | −1.14 |
| b* | 1.79 | 1.83 | 2.08 | 2.12 | 2.05 |
| Whiteness index @C/10° | 82 | 82 | 82 | 81 | 81 |
| Whiteness index @D65/10° | 81 | 81 | 81 | 80 | 80 |
| Yellowness index @C/10° | 2 | 3 | 3 | 3 | 3 |
| Yellowness index @D65/10° | 2 | 3 | 3 | 3 | 3 |
| Gloss @20° | 72 | 70 | 76 | 81 | 81 |
| Gloss @60° | 87 | 89 | 90 | 91 | 91 |
| Pendulum hardness | 24 | 25 | 24 | 24 | 24 |
| Drying times | | | | | |
| Surface dry Hours:Minutes | 1:00 | 1:45 | 1:30 | 1:30 | 1:30 |
| Tack free dry Hours:Minutes | 3:00 | 2:00 | 2:00 | 3:00 | 3:00 |
| Hard dry Hours:xMinutes | 4:00 | 5:00 | 6:15 | 4:45 | 5:00 |

Remarks:
- 90:10 MPKO:CHO showed better anti-skinning protection than MEKO at same dosage.
- 90:10 MPKO:CHO showed comparable anti-skinning protection to MEKO at 20% lower dosage.
- 90:10 MPKO:CHO showed comparable color values, gloss, pendulum hardness, whiteness index and yellowness index with MEKO in white alkyd enamel.
- 90:10 MPKO:CHO showed slightly longer hard dry times at equal use level but comparable hard dry times at 20% lower dosage.

Summary of Example I

A 10% solution of cyclohexanone oxime in methyl propyl ketoxime can be used in place of methyl ethyl ketoxime as an anti-skinning agent in alkyd paint containing metal carboxylate driers at 20% lower dose without imparting detrimental properties.

Example 2

In this example, a mixture consisting of 80% MPKO and 20% of Zinc Octoate (2 ethyl hexanoate) in 2 ethyl hexanoic acid at 23% zinc metal content (Zn23%) was used as a petroleum soluble zinc carboxylate, designated as 80:20 MPKO:Zn23% was used as the anti-skinning agent. This mixture contains 4.6% zinc metal content.

Preparation of White Alkyd Enamel:

| Raw Materials | % by wt. | Procedure |
|---|---|---|
| Mill Base | | |
| Long oil alkyd (S-10702) | 20.00 | Mix resin, dispersing additive, |
| Pat-Add DA 707 dispersing additive | 0.40 | viscogel gelly and white spirit at 1000 RPM for 10 minutes |
| Viscogel b4 (10%) | 3.00 | |
| White spirit | 8.00 | |
| TiO$_2$ (R-902) | 22.00 | Add under stirring and grind it until 10 μm fineness |
| Let down | | |
| Long oil alkyd (S-10702) | 30.00 | Add the remaining resin and |
| White Spirit | 16.60 | white spirit at 800 RPM and mix it for 15 minutes at 800 RPM |
| Total | 100.00 | |

Addition of Driers and Anti-Skinning Agent:

|  | Trial 1A | Trial 2A | Trial 13 | Trial 14 | Trial 15 | Trial 16 | Trial 17 |
|---|---|---|---|---|---|---|---|
| Anti-skinning agent used | None | MEKO | 80:20 MPKO: Zn23% | | | | |
| White alkyd enamel | 100.00 | 100.00 | 100.00 | 100.00 | 100.00 | 100.00 | 100.00 |
| Co 10% (lot no. 1961-01-2021) | 0.18 | 0.18 | 0.18 | 0.18 | 0.18 | 0.18 | 0.18 |
| Zr 18% (lot no. 140-02-2021) | 0.58 | 0.58 | 0.58 | 0.58 | 0.58 | 0.58 | 0.58 |

-continued

|  | Trial 1A | Trial 2A | Trial 13 | Trial 14 | Trial 15 | Trial 16 | Trial 17 |
|---|---|---|---|---|---|---|---|
| Ca 10% (lot no. 404-04-2021) | 0.70 | 0.70 | 0.70 | 0.70 | 0.70 | 0.70 | 0.70 |
| Dosage % of Anti-skinning agent |  | 0.20 | 0.20 | 0.18 | 0.16 | 0.14 | 0.12 |

Comparison of Skinning Tendency:

|  | Trial 1A | Trial 2A | Trial 13 | Trial 14 | Trial 15 | Trial 16 | Trial 17 |
|---|---|---|---|---|---|---|---|
| Anti-skinning agent used | None | MEKO | 80:20 MPKO:Zn23% | | | | |
| Dosage of anti-skinning agent | — | 0.20 | 0.20 | 0.18 | 0.16 | 0.14 | 0.12 |
| Duration of complete skinning | 2 days | 8 days | 9 days | 9 days | 9 days | 8 days | 8 days |

Comparison of Physical Properties and Dry Times:

|  | Trial 1A | Trial 2A | Trial 13 | Trial 14 | Trial 15 | Trial 16 | Trial 17 |
|---|---|---|---|---|---|---|---|
| Anti-skinning agent used | None | MEKO | 80:20 MPKO:Zn23% | | | | |
| Dosage of anti-skinning agent | — | 0.2 | 0.2 | 0.18 | 0.16 | 0.14 | 0.12 |
| Viscosity in KU | 83 | 83 | 69 | 69 | 69 | 69 | 69 |
| L* | 95.28 | 95.33 | 95.77 | 95.7 | 95.59 | 95.68 | 95.51 |
| a* | −1.14 | −1.13 | −1.12 | −1.12 | −1.1 | −1.12 | −1.11 |
| b* | 1.79 | 1.83 | 1.65 | 1.65 | 1.57 | 1.65 | 1.55 |
| Whiteness index @D65/10° | 81 | 81 | 83 | 83 | 83 | 83 | 83 |
| Yellowness index @D65/10° | 2 | 3 | 2.2 | 2.3 | 2.2 | 2.1 | 2 |
| Gloss @20° | 72 | 70 | 72 | 74 | 72 | 74 | 78 |
| Gloss @60° | 87 | 89 | 87 | 88 | 89 | 89 | 89 |
| Pendulum hardness | 24 | 25 | 21 | 21 | 21 | 21 | 21 |
| Drying time | | | | | | | |
| Surface dry Hours:Minutes | 1:00 | 1:45 | 1:30 | 1:30 | 1:30 | 1:30 | 1:30 |
| Tack free dry Hours:Minutes | 3:00 | 2:00 | 2:00 | 2:00 | 2:00 | 2:00 | 2:00 |
| Hard dry Hours:Minutes | 4:00 | 5:00 | 2:45 | 3:15 | 3:30 | 3:45 | 3:45 |

Remarks:
- 80:20 MPKO:Zn23% showed better anti-skinning protection than MEKO at same dosage.
- 80:20 MPKO:Zn23% showed comparable anti-skinning protection to MEKO at 40% lower dosage.
- 80:20 MPKO:Zn23% showed comparable color values, gloss, pendulum hardness and whiteness index compared with MEKO in white alkyd enamel.
- 80:20 MPKO:Zn23% showed slightly less yellowing compared to MEKO in white alkyd enamel.
- 80:20 MPKO:Zn23% showed comparable dry times at 40% lower dosage than MEKO.

Summary of Example 2

A 20% solution of a 23% metal content Zinc Octoate in methyl propyl ketoxime can be used in place of methyl ethyl ketoxime as an anti-skinning agent in alkyd paint containing metal carboxylate driers at 40% lower dose without imparting any detrimental properties.

Example 3

In this example, a mixture consisting of 80% MPKO 10% CHO and 10% Zn23% designated as 80:10:10 MPKO:CHO:Zn23% was used as the anti-skinning agent.

Preparation of White Alkyd Enamel:

| Raw Materials | % by wt. | Procedure |
|---|---|---|
| Mill Base | | |
| Long oil alkyd (S-10702) | 20.00 | Mix resin, dispersing additive, |
| Pat-Add DA 707 dispersing additive | 0.40 | viscogel gelly and white spirit at 1000 RPM for 10 minutes |
| Viscogel b4 (10%) | 3.00 | |
| White spirit | 8.00 | |
| TiO$_2$ (R-902) | 22.00 | Add under stirring and grind it until 10 µm fineness |
| Let down | | |
| Long oil alkyd (S-10702) | 30.00 | Add the remaining resin and |
| White spirit | 16.60 | white spirit at 800 RPM and mix it for 15 minutes at 800 RPM |
| Total | 100.00 | |

Addition of Driers and Anti-Skinning Agent:

| | Trial 1B | Trial 2B | Trial 3B | Trial 4B | Trial 5B | Trial 6B | Trial 7B |
|---|---|---|---|---|---|---|---|
| Anti-skinning agent used | Blank | MEKO | 80:10:10 MPKO:CHO:Zn23% | | | | |
| White alkyd enamel | 100.00 | 100.00 | 100.00 | 100.00 | 100.00 | 100.00 | 100.00 |
| Patcham Cobalt 10% | 0.18 | 0.18 | 0.18 | 0.18 | 0.18 | 0.18 | 0.18 |
| Patcham Zirconium 18% | 0.58 | 0.58 | 0.58 | 0.58 | 0.58 | 0.58 | 0.58 |
| Patcham Calcium 10% | 0.70 | 0.70 | 0.70 | 0.70 | 0.70 | 0.70 | 0.70 |
| Dosage % of Anti-skinning agent | — | 0.2 | 0.2 | 0.18 | 0.16 | 0.14 | 0.12 |

Comparison of Skinning tendency:

| | Trial 1B | Trial 2B | Trial 3B | Trial 4B | Trial 5B | Trial 6B | Trial 7B |
|---|---|---|---|---|---|---|---|
| Anti-skinning agent used | Blank | MEKO | 80:10:10 MPKO:CHO:Zn23% | | | | |
| Dosage of anti-skinning agent | — | 0.2 | 0.2 | 0.18 | 0.16 | 0.14 | 0.12 |
| Time for complete skinning/days | 1 | 7 | 9 | 8 | 8 | 8 | 7 |

Comparison of Physical Properties and Dry Times:

| | Trial 1B | Trial 2B | Trial 3B | Trial 4B | Trial 5B | Trial 6B | Trial 7B |
|---|---|---|---|---|---|---|---|
| Anti-skinning agent used | Blank | MEKO | 80:10:10 MPKO:CHO:Zn23% | | | | |
| Dosage of anti-skinning agent | — | 0.2 | 0.2 | 0.18 | 0.16 | 0.14 | 0.12 |
| L* | 96.26 | 96.21 | 96.3 | 95.04 | 95.16 | 95.06 | 94.81 |
| a* | −1.14 | −1.13 | −1.14 | −1.06 | −1.08 | −1.07 | −1.06 |
| b* | 1.96 | 1.99 | 2.08 | 1.3 | 1.28 | 1.29 | 1.25 |
| Whiteness index @D65/10° | 83 | 83 | 83 | 83 | 83 | 83 | 83 |
| Yellowness index @65/10° | 2.7 | 2.7 | 3 | 1.7 | 1.7 | 1.5 | 2 |
| Gloss @20° | 77 | 76 | 79 | 74 | 74 | 74 | 80 |
| Gloss @60° | 91 | 90 | 91 | 88 | 89 | 89 | 89 |
| Pendulum hardness | 22 | 23 | 22 | 22 | 22 | 22 | 21 |
| Drying time | | | | | | | |
| Surface dry Hours: Mins | 1:50 | 1:30 | 1:45 | 1:45 | 1:50 | 2:00 | 2:00 |
| Tack free dry Hours:Mins | 2:10 | 2:00 | 2:00 | 2:15 | 2:00 | 2:15 | 2:15 |
| Hard dry Hours: Mins | 4:00 | 3:00 | 3:30 | 3:45 | 4:00 | 4:00 | 3:45 |

Remarks:

80:10:10 MPKO:CHO:ZN23% provided better protection against skin formation than MEKO at same dosage.

80:10:10 MPKO:CHO:ZN23% provided comparable protection against skin formation to MEKO at 40% lower dosage.

80:10:10 MPKO:CHO:ZN23% showed comparable color values, gloss, pendulum hardness and whiteness index compared with MEKO in white alkyd enamel.

80:10:10 MPKO:CHO:ZN23% showed marginally slower dry times at 40% lower dosage then MEKO.

Summary of Example 3

A mixture consisting of 80% MPKO 10% CHO and 10% Zn23% (2.3% zinc metal content) can be used, in alkyd based coatings containing metal carboxylate driers, as the anti-skinning agent in place of MEKO at a dose of approximately 40% less than that required for MEKO to provide comparable protection against skinning and comparable dry times for the resulting coating.

Example 4

In this example, a mixture consisting of 48% MPKO, 6% CHO, 6% Zinc 23% and 40% Petroleum distillate de-aromatized, >80° C. flash point (D80) designated as 48:6:6:40 MPKO:CHO:Zn23%:D80 was used as the anti-skinning agent.

Preparation of White Alkyd Enamel:

| Raw Materials | % by wt. | Procedure |
|---|---|---|
| Mill Base | | |
| Long oil alkyd (S-10702) | 20.00 | Mix resin, dispersing additive, viscogel gelly and white spirit at 1000 RPM for 10 minutes |
| Pat-Add DA 707 dispersing additive | 0.40 | |
| Viscogel b4 (10%) | 3.00 | |
| White spirit | 8.00 | |
| TiO₂ (R-902) | 22.00 | Add under stirring and grind it until 10 μm fineness |
| Let down | | |
| Long oil alkyd (S-10702) | 30.00 | Add the remaining resin and white spirit at 800 RPM and mix it for 15 minutes at 800 RPM |
| White spirit | 16.60 | |
| Total | 100.00 | |

Addition of Driers and Anti-Skinning Agent:

|  | Trial 1B | Trial 2B | Trial 18 | Trial 19 | Trial 20 | Trial 21 | Trial 22 |
|---|---|---|---|---|---|---|---|
| Anti-skinning agent used | Blank | MEKO | 48:6:640 MPKO:CHO:Zn23%:D80 | | | | |
| White alkyd enamel | 100.00 | 100.00 | 100.00 | 100.00 | 100.00 | 100.00 | 100.00 |
| Patcham Cobalt 10% | 0.18 | 0.18 | 0.18 | 0.18 | 0.18 | 0.18 | 0.18 |
| Patcham Zirconium 18% | 0.58 | 0.58 | 0.58 | 0.58 | 0.58 | 0.58 | 0.58 |
| Patcham Calcium 10% | 0.70 | 0.70 | 0.70 | 0.70 | 0.70 | 0.70 | 0.70 |
| Dosage % of Anti-skinning agent | — | 0.2 | 0.2 | 0.18 | 0.16 | 0.14 | 0.12 |

Comparison of Skinning Tendency:

|  | Trial 1B | Trial 2B | Trial 18 | Trial 19 | Trial 20 | Trial 21 | Trial 22 |
|---|---|---|---|---|---|---|---|
| Anti-skinning agent used | Blank | MEKO | 48:6:640 MPKO:CHO:Zn23%:D80 | | | | |
| Dosage of anti-skinning agent | — | 0.2 | 0.2 | 0.18 | 0.16 | 0.14 | 0.12 |
| Time for complete skinning/days | 1 | 7 | 7 | 6 | 6 | 6 | 5 |

Comparison of Physical Properties and Dry Times:

|  | Trial 1B | Trial 2B | Trial 18 | Trial 19 | Trial 20 | Trial 21 | Trial 22 |
|---|---|---|---|---|---|---|---|
| Anti-skinning agent used | Blank | MEKO | 48:6:40 MPKO:CHO:Zn23%:D80 | | | | |
| Dosage of anti-skinning agent | — | 0.2 | 0.2 | 0.18 | 0.16 | 0.14 | 0.12 |
| L* | 96.26 | 96.21 | 96.13 | 96.15 | 96.27 | 96.25 | 96.23 |
| a* | −1.14 | −1.13 | −1.2 | −1.14 | −1.16 | −1.17 | −1.17 |
| b* | 1.96 | 1.99 | 1.99 | 2.01 | 2.11 | 2.07 | 2.17 |
| Whiteness index @ D65/10° | 83 | 83 | 83 | 83 | 83 | 83 | 83 |
| Yellowness index @ 65/10° | 2.7 | 2.7 | 2.7 | 2.7 | 2.7 | 2.7 | 2.9 |
| Gloss @20° | 77 | 76 | 80 | 80 | 77 | 77 | 75 |
| Gloss @60° | 91 | 90 | 90 | 90 | 90 | 90 | 90 |
| Pendulum harness | 22 | 23 | 21 | 21 | 21 | 21 | 21 |
| Drying time | | | | | | | |
| Surface dry Hours:Mins | 1:50 | 2:00 | 2:00 | 2:00 | 2:15 | 2:00 | 2:00 |
| Tack free dry Hours:Mins | 2:10 | 2:30 | 2:45 | 2:30 | 2:40 | 2:20 | 2:30 |
| Hard dry Hours:Mins | 4:00 | 4:45 | 4:30 | 4:30 | 4:40 | 4:30 | 4:45 |

Remarks:
  48:6:6:40 MPKO:CHO:ZN23%:D80 provided similar protection against skin formation as MEKO at same dosage.
  48:6:6:40 MPKO:CHO:ZN23%:D80 showed comparable color values, gloss, pendulum 10 hardness and whiteness index compared with MEKO in white alkyd enamel.
  48:6:6:40 MPKO:CHO:ZN23%:D80 showed comparable dry times to the alkyd enamel protected by MEKO at equal dose.

Summary of Example 4

A mixture consisting of 48% MPKO, 6% CHO, 6% Zn23% and 40% D80 can be used in alkyd based coatings containing metal carboxylate driers, as the anti-skinning agent in place of MEKO at the same dose level to provide similar protection against skin formation and comparable dry times for the resulting coating.

We claim:
1. A clear homogenous composition, for use as an anti-skinning composition with alkyd-based coating materials containing metal carboxylate driers, which comprises a mixture of cyclohexanone oxime and/or a petroleum distillate soluble zinc carboxylate dissolved in methyl propyl ketoxime, wherein the methyl propyl ketoxime comprises from 35 to 91% by weight of the composition.
2. The composition of claim 1, wherein the methyl propyl ketoxime comprises from 46 to 70% by weight of the composition.
3. The composition of claim 1, wherein the methyl propyl ketoxime comprises from 47 to 49% by weight of the composition.
4. The composition of claim 1, wherein the cyclohexanone oxime is present in concentrations of up to 15% by weight of the composition.
5. The composition of claim 1, wherein the cyclohexanone oxime is present in concentrations of 3.0 to 6.2% by weight of the composition.
6. The composition of claim 1, wherein the cyclohexanone oxime is present in concentrations of 5.8 to 6.2% by weight of the composition.
7. The composition of claim 1, wherein the cyclohexanone oxime is present in concentrations from 9% to 15% by weight of the composition.
8. The composition of claim 1, wherein the cyclohexanone oxime is present in concentrations from 9% to 11% by weight of the composition.

9. The composition of claim 1, further comprising up to 50% by weight of a petroleum distillate.

10. The composition of claim 9, wherein the petroleum distillate soluble zinc carboxylate comprises up to 7.0% by weight zinc metal content.

11. The composition of claim 1, wherein the petroleum distillate soluble zinc carboxylate comprises 1.8 to 7.0% by weight zinc content.

12. The composition of claim 1, wherein the petroleum distillate soluble zinc carboxylate comprises 4.5 to 4.7% by weight zinc content.

13. The composition of claim 9, wherein the petroleum distillate soluble zinc carboxylate comprises 0.9 to 3.5% by weight zinc content.

14. The composition of claim 9, wherein the petroleum distillate soluble zinc carboxylate comprises 2.2 to 2.4% by weight zinc content.

15. The composition of claim 10, wherein the petroleum distillate comprises mineral spirits or white spirits.

16. The composition of claim 10, wherein the petroleum distillate comprises 30 to 50% by weight of the composition.

17. The composition of claim 10, wherein the petroleum distillate comprises 34 to 46% by weight of the composition.

18. The composition of claim 10, wherein the petroleum distillate comprises 38 to 42% by weight of the composition.

19. A clear homogenous composition, for use as an anti-skinning composition with alkyd-based coating materials containing metal carboxylate driers, which comprises a mixture of cyclohexanone oxime and/or a petroleum distillate soluble zinc carboxylate dissolved in methyl propyl ketoxime, wherein the cyclohexanone oxime is present in concentrations greater than 0 to 15% by weight of the composition.

20. The composition of claim 19, wherein the cyclohexanone oxime is present in concentrations of 3.0 to 6.2% by weight of the composition.

21. The composition of claim 19, wherein the cyclohexanone oxime is present in concentrations of 5.8 to 6.2% by weight of the composition.

22. The composition of claim 19, wherein the cyclohexanone oxime is present in concentrations from 9% to 15% by weight of the composition.

23. The composition of claim 19, wherein the cyclohexanone oxime is present in concentrations from 9% to 11% by weight of the composition.

24. The composition of claim 19, further comprising up to 50% by weight of a petroleum distillate.

25. The composition of claim 24, wherein the petroleum distillate soluble zinc carboxylate comprises up to 7.0% by weight zinc metal content.

26. The composition of claim 24, wherein the petroleum distillate soluble zinc carboxylate comprises 1.8 to 7.0% by weight zinc content.

27. The composition of claim 24, wherein the petroleum distillate soluble zinc carboxylate comprises 4.5 to 4.7% by weight zinc content.

28. The composition of claim 24, wherein the petroleum distillate soluble zinc carboxylate comprises 0.9 to 3.5% by weight zinc content.

29. The composition of claim 24, wherein the petroleum distillate soluble zinc carboxylate comprises 2.2 to 2.4% by weight zinc content.

30. The composition of claim 25, wherein the petroleum distillate comprises mineral spirits or white spirits.

31. The composition of claim 25, wherein the petroleum distillate comprises 30 to 50% by weight of the composition.

32. The composition of claim 25, wherein the petroleum distillate comprises 34 to 46% by weight of the composition.

33. The composition of claim 25, wherein the petroleum distillate comprises 38 to 42% by weight of the composition.

* * * * *